Feb. 7, 1967 R. W. MITCHELL 3,303,433

ARRANGEMENT FOR DISTRIBUTING TIMING SIGNALS
TO AVOID UNDESIRABLE REFLECTED
SIGNAL TRIGGERING

Filed April 16, 1965

INVENTOR
ROY WILLIAM MITCHELL

BY Hane and Nydick
ATTORNEYS

United States Patent Office 3,303,433
Patented Feb. 7, 1967

3,303,433

ARRANGEMENT FOR DISTRIBUTING TIMING SIGNALS TO AVOID UNDESIRABLE REFLECTED SIGNAL TRIGGERING

Roy William Mitchell, Bracknell, England, assignor to International Computers and Tabulators Limited, London, England, a British company Filed Apr. 16, 1965, Ser. No. 448,616
Claims priority, application Great Britain, Apr. 29, 1964, 17,884/64
6 Claims. (Cl. 331—107)

This invention relates to distribution systems for electrical signals.

Many electronic data processing systems employ the synchronous mode of operation in which a fixed timing relationship is maintained between the various parts of the system by timing signals which are generated by a central source. These timing signals, which are often referred to as clock or reset signals, may be in the form of a regular train of pulses or a sine wave. In some systems, two or more phases of the timing signal are derived from the central source.

The timing signals are fed to every logic element in systems employing synchronous logic, adjacent logic elements in a chain of elements often being supplied with differently phased timing signals. Alternatively, the timing signals may be applied to selected logic elements only. For example, an adder may consist of a group of logic elements which operate asynchronously, but the transfer of signals to and from the adders is controlled by logic elements which are synchronized by the timing signals.

The distribution of the timing signals throughout the system becomes more difficult as the frequency of the timing signals is increased. The logic elements very often present a non-linear input impedance and an element can produce reflected signals which can cause malfunctioning of other elements connected to the same source. The necessarily high power level of the timing signals can easily produce spurious signals in information channels by stray coupling.

The transmission time of the signal over the connection between the timing source and the more remote logic elements may be a substantial part of the period of the timing signals. The physical length of the connections then has to be adjusted to preserve the correct relative phasing of the timing signals present in different parts of the system.

Furthermore, it is difficult to construct sources providing sufficient power for the timing signals at frequencies of 100 mc./s. and more, particularly if a pulse waveform is used.

It is the object of the invention to provide an improved arrangement for the distribution of timing signals.

According to the invention an arrangement for distributing timing signals includes a master one-port signal generator, at least one slave one-port signal generator adapted to be synchronised by signals from the master generator, and a transmission line coupling the master generator to the slave generator, or to each slave generator, the length of the transmission line being such that twice the time taken for a pulse to travel from the master generator to the slave generator plus the time taken by the slave generator to respond to a signal from the master generator is substantially equal to an integral number of periods, including one, of the master generator signal, and the impedances of the signal generators are substantially equal to the characteristic impedance of the transmission line.

The invention will now be described, by way of example, with reference to the accompanying drawing, in which.

Figure 1:
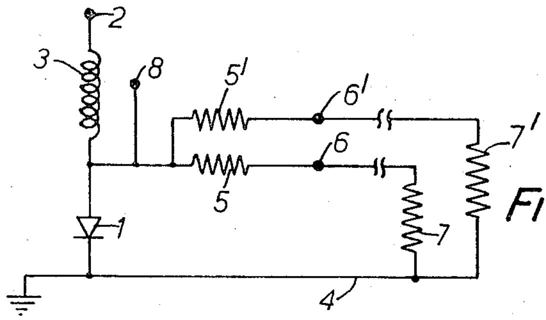
FIGURE 1 is a simplified diagram of a tunnel diode signal generator.

A simplified circuit of a tunnel diode oscillator is shown in FIGURE 1. A tunnel diode 1 has one terminal connected to a positive power supply terminal 2 through an inductor 3. The other terminal of the tunnel diode is connected to a ground line 4. The junction of the tunnel diode and the inductor is connected through a resistor 5 to an output terminal 6. A load, represented by a resistor 7 may be connected between the terminal 6 and the line 4. A further load 7′ may be connected to a second output terminal 6′, which is connected through a resistor 5′ to the diode anode.

The behavior of the circuit is determined primarily by the value of the voltage applied to terminal 2 and the value of the inductor 3. If the voltage is such that the diode is brought to the negative resistance region of its characteristic, the value of the inductor is relatively large and the combined resistance of resistor 5 and load 7 (and of 5′ and 7′ if connected) is several times the negative resistance of the diode, the circuit operates as a relaxation oscillator. The circuit is free-running, the voltage across the diode taking the form of a succession of pulses and the period between successive pulses being determined by the circuit constants. The current through the diode approximates to a triangular waveform.

The oscillator may be synchronized to an external train of signals, the period between consecutive signals being slightly shorter than the period between consecutive signals from the oscillator by applying each signal as a current step to terminal 8. Suppose that the current in the diode 1 is at 0.9 of its maximum value when a current step of 0.1 of the maximum diode current is fed to the diode via terminal 8. The resultant current through the diode equals the maximum diode current and the diode switches after a very small delay. It has switched earlier than if the diode current had risen to the maximum in the normal way. Consequently, the oscillator will be synchronised to the external train of signals on each occurrence of a signal. If the external signal is applied when the diode current is well below the maximum value, the signal will not affect the switching. However, since the period between the signals is slightly shorter than the period of the oscillator, one of the signals will eventually occur at a time when the oscillator is sensitive to triggering and the oscillator will, thereafter, be locked in synchronism. The time during which the oscillator is sensitive to triggering can be increased by operating the oscillator close to the monostable condition. This can be achieved by increasing the resistance of the inductor and/or the supply source for terminal 2 so that the largest current which can be supplied to the diode is little more than the maximum current drawn by it during the oscillatory cycle. It has been assumed in considering synchronisation that the amplitude and duration of each synchronising signal are such that the general mode of operation of the oscillator is not appreciably altered.

A relaxation oscillator, similar to that described, can conveniently be used as a timing signal generator for controlling high speed computer logic elements, operating at 100 mc./s. or more. It has already been pointed out that difficulties arise in distributing the timing signals to the logic elements. These difficulties are largely overcome by the arrangement shown in FIGURE 2, in which oscillators similar to that shown in FIGURE 1 are shown in schematic form.

Figure 2:
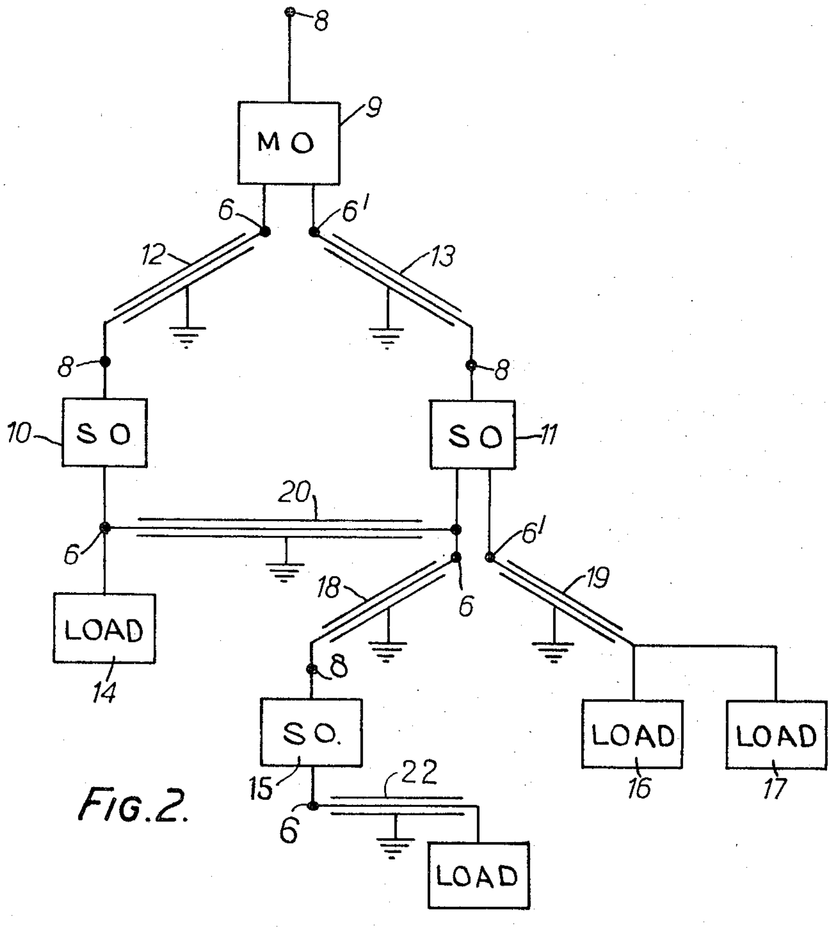
FIGURE 2 is a schematic drawing of an assemblage of a master generator and a group of slave generators.

A master oscillator 9 is used to synchronise a pair of slave oscillators 10 and 11. Each of these oscillators may be similar to the tunnel diode oscillator already described. The output terminals 6 and 6' of the master oscillator 9 is connected via transmission lines 12 and 13 to the synchronising terminals 8 of the slave oscillators 10 and 11, respectively. The transmission lines in FIGURE 2 are shown as co-axial lines, but it will be appreciated that any other suitable form of transmission line, such as strip lines, may be used. The length of each of the transmission lines 12 and 13, is such that a pulse from a slave oscillator which travels to the master oscillator always arrives in phase with a pulse being generated by the master oscillator. This is achieved by making twice the delay time of the transmission line plus the time taken by the slave oscillator to switch in response to a synchronising pulse from the master oscillator substantially equal to an integral number of periods of the master oscillator. In the simplest case, the delay time of the line is equal to half the period of the master oscillator less half the switching delay of the slave oscillator. Thus, the leading edge of a pulse generated by the master oscillator 9 will travel along the transmission line 12 and will reach the slave oscillator 10 after rather less than half a period. The slave oscillator will generate a synchronised pulse after a time equal to the switching delay. The leading edge of this pulse will travel back along the transmission line 12 and will reach the master oscillator substantially coincident with the leading edge of the next pulse produced by the master oscillator.

The value of the resistors 5 and 5' in each oscillator circuit is chosen so that each oscillator is substantially matched to the characteristic impedance of the transmission to which it is connected. Thus, each oscillator acts as a matched termination in relation to a pulse travelling along the line, so that the pulse is absorbed and not reflected.

The synchronisation of the slave oscillators by the master oscillator is ensured primarily by running the master oscillator at a slightly higher frequency than the natural frequency of the slave oscillators. Undesirable reaction by the rest of the system on the master oscillator is largely eliminated by the matching of the oscillators to the transmission lines to prevent reflection and by the phasing of the pulses due to the selected line lengths. The stability of the master oscillator may also be increased by choosing an operating point at which the circuit is relatively insensitive to external triggering. The operating point for the slave oscillators is chosen to provide a relatively high sensitivity to triggering.

When starting up, the slave oscillators may run independently of the master oscillator, until a master oscillator pulse occurs at a time when the slave is sensitive to triggering, whereupon the slave will lock on in the manner already described. The pulses occurring during this pre-lock on period are absorbed without reflection, ensuring that no spurious synchronisation can occur.

The output terminal 6 of the slave oscillator 10 is shown directly connected to a load 14, which may be a known form of high speed logic circuit. The output terminals 6 and 6' of the slave oscillator 11 are shown connected to a further slave oscillator 15 by a transmission line 18, and to leads 16 and 17 by a transmission line 19. A load 21 is connected to the output terminal 6 of slave oscillator 15 by a transmission line 22.

The leads may be connected to the outputs of the slave oscillators in various ways. The only requirement is that the connection of the load should not interfere with the proper operation of the oscillator. If the load 14, for example, is passive and has a suitable pure resistance, it may be connected in a matched manner directly to the terminal 6 or via any convenient length of transmission line. Since the connection is matched, there is no reflection and the load itself does not generate any transient signals itself. Consequently, the load cannot interact with the oscillator beyond drawing power from it.

In the more general case, the load is likely to present a complex impedance which may not be constant if the load is a logic circuit which may be in one of two or more different states. Furthermore, such a load may generate switching transients which are propagated back along the line to the oscillator. The possibility of interaction is avoided as far as possible by reducing reflections by at least partial matching and/or by choosing a length for the coupling transmission such that any reflections or transients arrive at the oscillator at a time when it is not sensitive to triggering.

Provided the interaction has been reduced to a satisfactory level, the value of the matching resistors 5 and 5' in the connections to the load may be made small or even zero, thus allowing a larger proportion of the available power to be delivered to the load.

The output terminals 6 of the oscillators 10 and 11 connected together by a transmission line 20 which provides a delay of an integral multiple of half the period of the master oscillator 9. This ensures that the pulses from either oscillator 10 (or 11) arrive at the other oscillator 11 (or 10) in phase and provide for a degree of load sharing between the oscillators.

The arrangement shown in FIGURE 2 provides the levels of oscillators, the highest level being the master oscillator 9 and the middle level being the slave oscillators 10, 11 and the lowest level being the slave oscillator 15. Instead of the terminals 6 of the slave oscillators being connected to loads, they may be connected by transmission line links, similar to the links 12 and 13, to the terminals 8 of a further level of slave oscillators. The oscillators of this further level may be coupled to the loads, or even to yet another level of oscillators. A multi-level system may have smaller margins of stability and it may be desirable to increase these margins by using larger synchronising voltages at higher levels than at the lower levels and by using non-reciprocal couplings in certain of the transmission links.

Two phase timing systems are used quite frequently and this facility is easily obtained by making the delays of the lines 12 and 13 approximately equal to a half period and a whole period, respectively. The master oscillator 9 may be synchronised to a further timing source, such as a crystal controlled sine wave generator, by applying signals from that source to the terminal 8 of the master oscillator.

The invention has been described as using a one-port tunnel diode oscillator, but it will be appreciated that other forms of one-port oscillator, such as a transistor blocking oscillator with a common input/output transformer, may also be used.

It will be appreciated that the invention allows timing generators to be located wherever they may be desired in a complex equipment, such as a computer, whilst maintaining all the generators in synchronism to a high degree of accuracy.

What is claimed is:

1. An arrangement for distributing timing signals including a first one-port generator operable to generate a succession of first timing signals at substantially equal time intervals; at least one second one-port signal generator operable in response to each first timing signal to generate a second timing signal delayed by a first time period with respect to said first timing signal; and a transmission line connecting said first signal generator to said second signal generator, each of said first timing signals taking a second time period to travel along the transmission line from the first to the second signal generator, said second time period being substantially equal to one half the difference between an integral number, including one, of said time intervals and said first time period.

2. An arrangement as set forth in claim 1, in which the impedances of the first and second signal generators are substantially equal to the characteristic impedance of said transmission line.

3. An arrangement as set forth in claim 1, further including a load circuit; and a second transmission line connecting said second signal generator to said load circuit, each of said second timing signals taking a third time period to travel along said second transmission line from the second signal generator to the load, said third time period being substantially equal to one half an integral number, including one, of said time intervals.

4. An arrangement as set forth in claim 1, including at least one further slave signal generator operable in response to each second timing signal to generate a third timing signal delayed by a fourth time period with respect to said second timing signal; and a further transmission line connecting said second signal generator to said slave signal generator, each of said second timing signals taking a third time period to travel along the further transmission line from the second to the slave signal generator, said third time period being substantially equal to one half the difference between an integral number, including one, of said time intervals and said fourth time period.

5. An arrangement for distributing timing signals including a first one-port signal generator operative to generate a succession of first timing signals spaced by substantially equal time periods; a length of transmission line having a first end connected to said first signal generator and a second end, signals being delayed by a first time interval in travelling along the length of said line; a second one-port signal generator connected to the second end of the transmission line and operative in response to each of said first signals arriving at said second end to generate a corresponding second timing signal delayed by a second time interval relative to the first signal arriving at said second end; twice said first time interval plus said second time interval being substantially equal to one said time period.

6. An arrangement for distributing timing signals including a first one-port signal generator operative to generate a succession of first timing signals spaced at substantially equal time periods; a second one-port signal generator operative to generate a second timing signal in response to each first timing signal; a third one-port signal generator operative to generate a third timing signal in response to each first timing signal; a first transmission line connecting the second generator to the first generator, the length of the first transmission line being such that twice the transmission time of the first line plus the response time of the second generator is substantially equal to said time period; a second transmission line connecting the third generator to the first generator, the length of the second transmission line being such that twice the transmission time of the second line plus the response time of the third generator is substantially equal to said time period; and a third transmission line connecting the second generator to the third generator, the length of said third transmission line being such that twice the transmission time for one of said second signals to travel along said third transmission line from said second to said third generator is substantially equal to an integral number, including one, of said time periods.

References Cited by the Examiner

UNITED STATES PATENTS 3,100,284 8/1963 Kerns ............ 331—55

3,209,170 9/1965 Cooperman ........ 307—88.5

ROY LAKE, *Primary Examiner.*

J. KOMINSKI, *Assistant Examiner.*